(12) United States Patent
Liang et al.

(10) Patent No.: US 10,704,574 B2
(45) Date of Patent: Jul. 7, 2020

(54) HVAC AIRFLOW BAFFLE

(71) Applicant: DENSO International America, Inc., Southfield, MI (US)

(72) Inventors: Litao Liang, Troy, MI (US); Michael Polus, Belleville, MI (US); Brett Wilson, Allen Park, MI (US); Jie Zeng, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 48 days.

(21) Appl. No.: 16/119,066

(22) Filed: Aug. 31, 2018

(65) Prior Publication Data
US 2020/0072257 A1 Mar. 5, 2020

(51) Int. Cl.
*F16L 55/02* (2006.01)
*F15D 1/00* (2006.01)
*F16L 55/027* (2006.01)

(52) U.S. Cl.
CPC ...... *F15D 1/0005* (2013.01); *F16L 55/02718* (2013.01)

(58) Field of Classification Search
CPC .............. F15D 1/0005; F16L 55/02709; F16L 55/02718; G01F 1/3218; G01F 1/662; G01F 55/00
USPC ............ 138/37, 39–42, 44; 366/340; 62/186
See application file for complete search history.

(56) References Cited

U.S. PATENT DOCUMENTS

| | | | | |
|---|---|---|---|---|
| 3,840,051 A | * | 10/1974 | Akashi | F15D 1/025 138/37 |
| 4,786,185 A | * | 11/1988 | Knief | B01F 5/0682 261/108 |
| 5,160,697 A | * | 11/1992 | Verdier | G21C 3/3206 376/352 |
| 5,327,941 A | * | 7/1994 | Bitsakis | B01F 5/0682 138/42 |
| 5,488,634 A | * | 1/1996 | Johansson | G21C 3/3206 376/313 |
| 5,495,872 A | * | 3/1996 | Gallagher | F15D 1/025 138/40 |
| 5,762,107 A | * | 6/1998 | Laws | F15D 1/025 138/44 |
| 5,918,279 A | * | 6/1999 | Hecht | G01F 1/6842 73/204.21 |
| 6,145,544 A | * | 11/2000 | Dutertre | F16L 55/02718 138/39 |
| 6,186,179 B1 | * | 2/2001 | Hill | F15D 1/0005 138/39 |

(Continued)

FOREIGN PATENT DOCUMENTS

CN 205980182 U 2/2017
DE 10121286 A1 10/2002

*Primary Examiner* — Patrick F Brinson
(74) *Attorney, Agent, or Firm* — Harness, Dickey & Pierce, P.L.C.

(57) ABSTRACT

An airflow baffle for controlling airflow through a heating, ventilation, and air conditioning (HVAC) system. The airflow baffle includes a main body, an upstream side of the main body, and a downstream side of the main body. A plurality of holes are defined by the main body, and extend through the main body between the upstream side and the downstream side. The plurality of holes include holes of various different diameters spaced apart at various different intervals to provide uniform airflow through the baffle.

19 Claims, 3 Drawing Sheets

(56) References Cited

U.S. PATENT DOCUMENTS

| | | | |
|---|---|---|---|
| 7,621,670 B1* | 11/2009 | England | B01F 5/0682 |
| | | | 138/40 |
| 7,997,096 B2 | 8/2011 | Stephenson | |
| 9,145,041 B2 | 9/2015 | Rademacher et al. | |
| 2014/0113536 A1 | 4/2014 | Goenka et al. | |
| 2016/0207373 A1 | 7/2016 | Schaake et al. | |

* cited by examiner

HVAC AIRFLOW BAFFLE

FIELD

The present disclosure relates to a baffle for a heating, ventilation, and air condition system that improves airflow through the system.

BACKGROUND

This section provides background information related to the present disclosure, which is not necessarily prior art.

Some vehicle heating, ventilation, and air conditioning (HVAC) systems do not include a cooling function, and thus do not include an evaporator. In place of an evaporator, such HVAC systems sometimes include a baffle plate to straighten and regulate airflow through the HVAC system. While current baffles are suitable for their intended use, they are subject to improvement. For example, current baffles result in poor airflow uniformity, reverse airflow, and an undesirably high pressure drop. The present disclosure advantageously includes an improved baffle that straightens airflow, maintains flow velocity uniformity, and maintains or reduces system pressure drop. The present disclosure provides numerous additional advantages and unexpected results as explained in detail herein and as one skilled in the art will appreciate.

SUMMARY

This section provides a general summary of the disclosure, and is not a comprehensive disclosure of its full scope or all of its features.

The present disclosure includes an airflow baffle for controlling airflow through a heating, ventilation, and air conditioning (HVAC) system. The airflow baffle includes a main body, an upstream side of the main body, and a downstream side of the main body. A plurality of holes are defined by the main body, and extend through the main body between the upstream side and the downstream side. The plurality of holes include holes of various different diameters spaced apart at various different intervals to provide uniform airflow through the baffle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
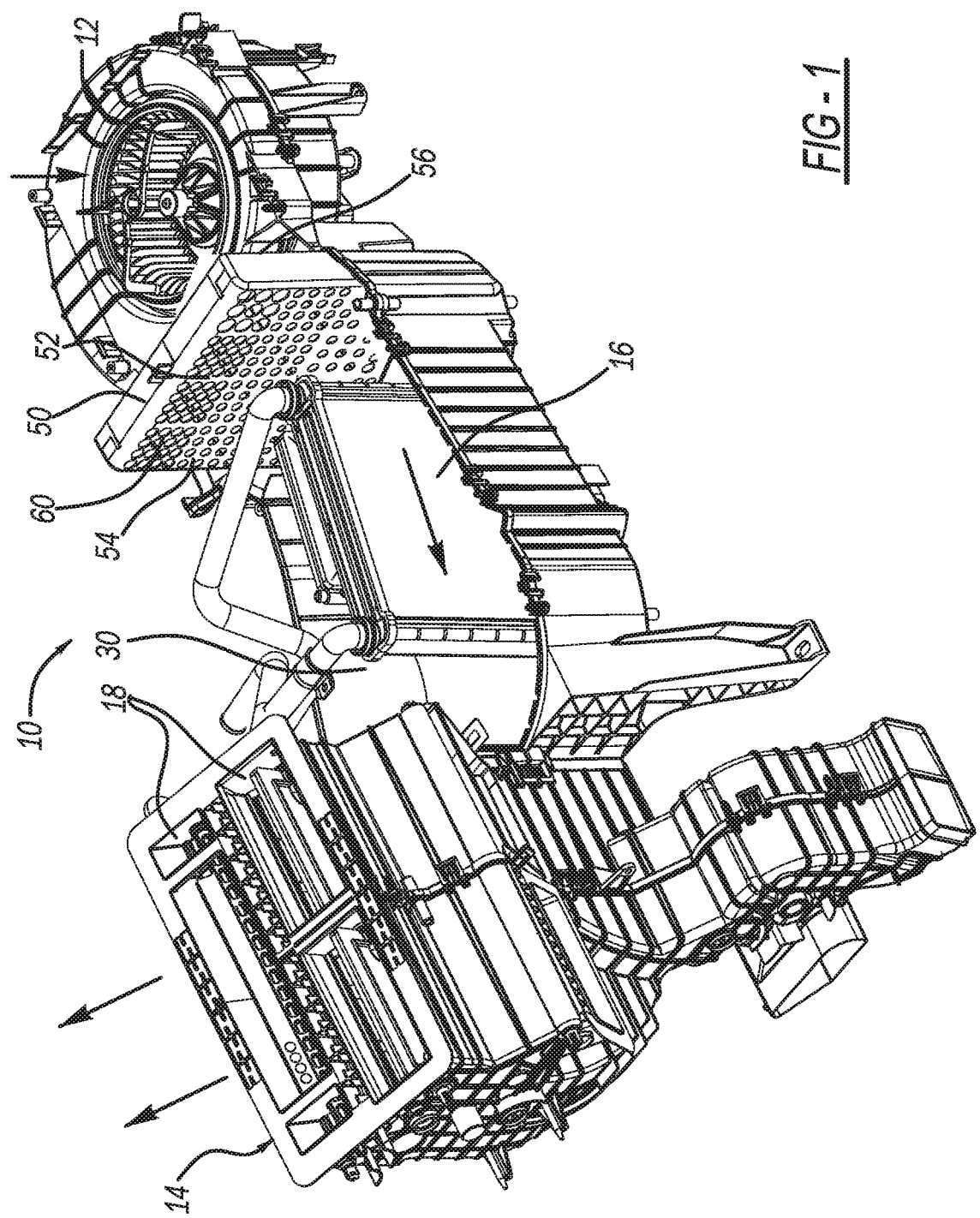
FIG. 1 illustrates a heating, ventilation, and air conditioning (HVAC) system including an airflow baffle in accordance with the present disclosure.

FIG. 1 illustrates a heating, ventilation, and air conditioning (HVAC) system 10 for use in any suitable vehicular or non-vehicular application. For example, the HVAC system 10 may be configured for use with any of the following exemplary vehicles: passenger vehicles, recreational vehicles, mass transit vehicles; military vehicles/equipment; construction vehicles/equipment; watercraft; aircraft, etc. The HVAC system 10 may be configured for use with any suitable non-vehicular applications as well, such as building HVAC systems for example.

The HVAC system 10 includes a blower 12, a distributor case 14, and an HVAC case 30 between the blower 12 and the distributor case 14. The blower 12 generates airflow, which flows through the HVAC case 30 to the distributor case 14. The HVAC case 30 includes a heater core 16, which when activated heats airflow flowing through the HVAC case 30. The distributor case 14 includes a plurality of outlets 18, though which airflow exits the distributor case 14. Airflow from the outlets 18 may flow directly to a vehicle passenger cabin, for example, or flow through any suitable intermediate duct work leading to the passenger cabin.

The HVAC system 10 further includes an airflow baffle 50 in accordance with the present disclosure. The airflow baffle 50 advantageously increases the uniformity of airflow through the HVAC system 10, decreases instances of reverse airflow, and reduces pressure drop within the HVAC system 10. The airflow baffle 50 may be arranged in the HVAC case 30 between the blower 12 and the distributor case 14 such that airflow flowing from the blower 12 to the distributor case 14 passes through the airflow baffle 50. Alternatively, the airflow baffle 50 may be arranged at any suitable position upstream of the blower 12 such that the blower 12 is between the airflow baffle 50 and the HVAC case 30. Alternatively, the airflow baffle 50 may be arranged at or proximate to the outlets 18 (or any other airflow outlets of the HVAC system 10 or outlets at a vehicle passenger cabin), or at any suitable position throughout the HVAC system 10.

Figure 2:
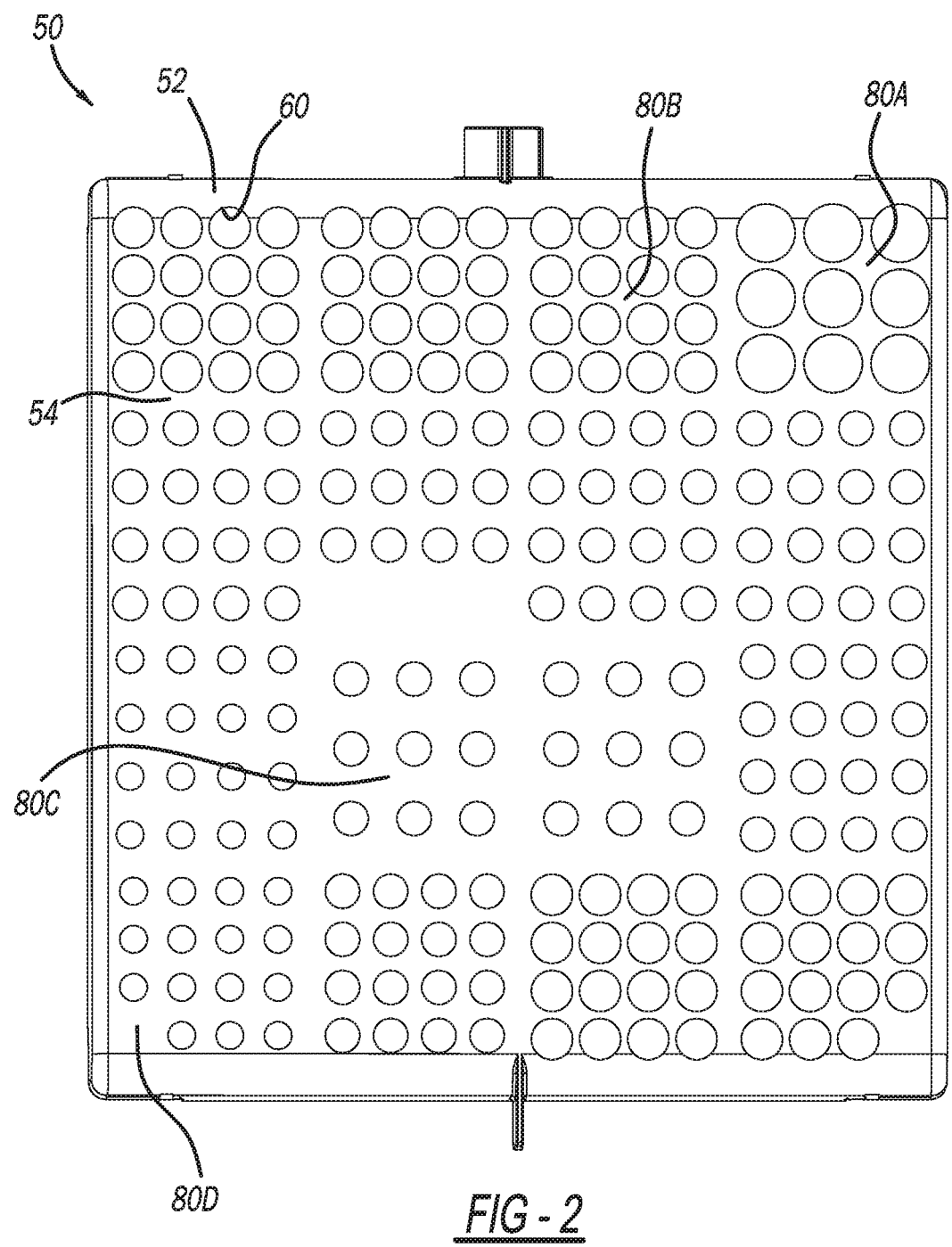
FIG. 2 is a plan view of a downstream side of the airflow baffle of FIG. 1.
Figure 3:
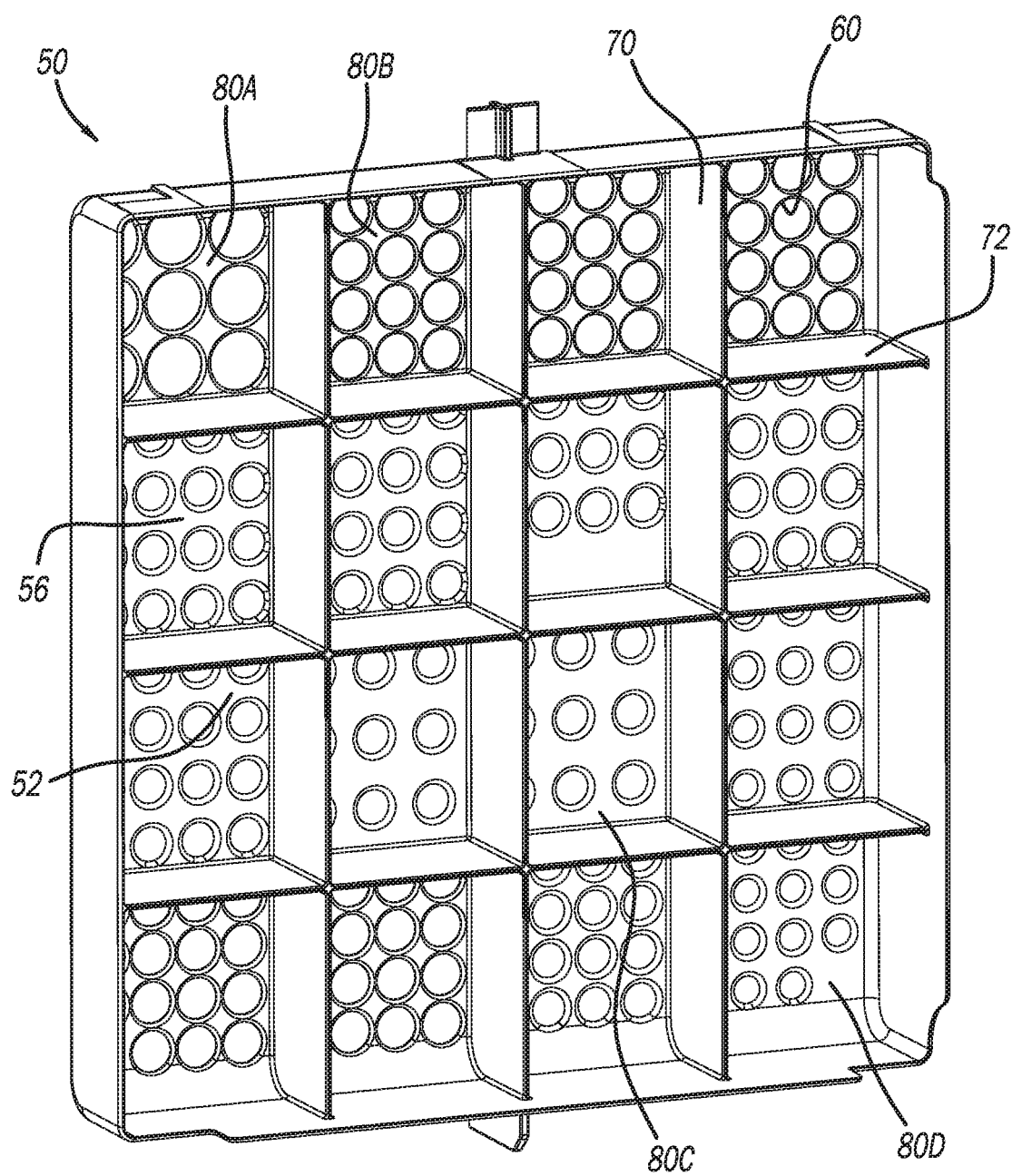
FIG. 3 is a perspective view of an upstream side of the airflow baffle of FIG. 1.

With continued reference to FIG. 1 and additional reference to FIGS. 2 and 3, the airflow baffle 50 includes a main body 52 having a downstream side 54 and an upstream side 56, which is opposite to the downstream side 54. A plurality of holes 60 are defined by the main body 52. The plurality of holes 60 extend through the main body 52 between the upstream side 56 and the downstream side 54. With particular reference to FIG. 3, a plurality of vertical vanes 70 extend vertically along a height of the main body 52, and a plurality of horizontal vanes 72 extend laterally across a width of the main body 52. The vertical vanes 70 and the horizontal vanes 72 are spaced apart to separate the plurality of holes 60 into a plurality of different groups, such as 16 groups as illustrated, which include a first group 80A, a second group 80B, a third group 80C, and a fourth group 80D.

Within each one of the groups of holes 60, the holes 60 have a common diameter and are equally spaced apart. Across the different groups of holes 60, however, the holes 60 may have different diameters, and may be spaced apart at different distances. For example, each one of the holes 60 of the first group 80A have the same diameter and are spaced apart the same distance relative to one another. The holes 60 of the second group 80B also have the same diameter and are equally spaced apart from one another. However, the holes 60 of the first group 80A have a larger diameter than the holes 60 of each one of the second group 80B, the third group 80C, and the fourth group 80D. The holes 60 of the second group 80B are smaller than the holes 60 of the first group 80A, but have diameters that are larger than the diameters of the holes 60 of the third group 80C and the fourth group 80D. With respect to spacing of the holes 60, the holes 60 of the third group 80C are spaced apart further than the holes 60 of the fourth group 80D. The holes 60 of the fourth group 80D are spaced apart further than the holes 60 of the first group 80A. FIGS. 2 and 3 illustrate various additional relative diameters and spacing of the holes 60 across the various groups defined by the vertical and horizontal vanes 70 and 72.

The various groups (such as groups 80A, 80B, 80C, and 80D) of the holes 60 are arranged about the main body 52 according to airflow intensity through the airflow baffle 50 in order to promote airflow uniformity, reduce instances of reverse airflow, and reduce pressure drop. Specifically, the groups of holes 60 are arranged about the main body 52 such that areas of the main body 52 that receive a relatively high amount of airflow have holes 60 with diameters that are relatively smaller than (and spacing of holes 60 that is relatively greater than) the diameters of holes 60 arranged at areas of the main body 52 that receive airflow travelling at a relatively lower speed. The arrangement of the groups of holes 60 illustrated in the drawings is for exemplary purposes only. The groups of holes 60 can be at any suitable position based on the intensity of airflow through the HVAC system 10.

The present disclosure thus provides numerous advantages. The non-uniform diameters and spacing of the holes 60 across the different hole groups (such as groups 80A, 80B, 80C, 80D) regulates airflow locally. The diameter and spacing of the holes 60 varies across the different groups (such as groups 80A, 80B, 80C, 80D) to achieve a target open area percentage. High speed inflow of air can be mitigated by holes 60 having relatively smaller diameters and relatively greater spacing between the holes 60, and relatively larger hole diameters and tighter spacing of holes 60 at areas of the main body 52 subject to relatively lower speed airflow can draw more air. Thus the overall inflow of air is redistributed more evenly before passing through the airflow baffle 50. The vertical and horizontal vanes 70 and 72 advantageously break down any incoming airflow vortex, in addition to separating the holes 60 into groups of holes 60 having different diameters and spacing. Thus the vanes 70 and 72 advantageously break down any narrowly-focused airflow streams.

In the example illustrated, the vanes 70 and 72 divide the holes 60 into 16 equal groups. The groups are arranged according to the diameters of the holes 60 and the spacing therebetween such that the velocity of airflow through each one of the groups is as uniform as possible. The groups of holes 60 are also arranged to reduce instances of reverse airflow, and to minimize pressure drop of the HVAC system 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An airflow baffle for controlling airflow through a heating, ventilation, and air conditioning (HVAC) system, the airflow baffle comprising:
   a main body;
   an upstream side of the main body;
   a downstream side of the main body; and
   a plurality of holes defined by the main body and extending through the main body between the upstream side and the downstream side, the plurality of holes including holes of various different diameters spaced apart at various different intervals to provide uniform airflow through the baffle;
   wherein the baffle is arranged in the HVAC system downstream of a blower of the HVAC system.

2. The airflow baffle of claim 1, wherein the baffle is in an airflow conduit extending between a blower and an HVAC case of the HVAC system, the HVAC case including a heater core.

3. The airflow baffle of claim 1, wherein the baffle is at an airflow outlet of the HVAC system.

4. The airflow baffle of claim 1, wherein the plurality of holes are arranged in groups, the plurality of holes of each group have the same diameter.

5. The airflow baffle of claim 4, wherein the plurality of holes of different groups have different diameters.

6. The airflow baffle of claim 4, wherein the plurality of holes of each group are evenly spaced apart from one another.

7. The airflow baffle of claim 4, wherein the groups are defined by vertical vanes and horizontal vanes.

8. The airflow baffle of claim 7, wherein the vertical vanes and the horizontal vanes extend from the upstream side of the main body.

9. The airflow baffle of claim 1, wherein the plurality of holes with relatively large openings are arranged to receive airflow of a relatively low velocity, and the plurality of holes with relatively small openings are arranged to receive airflow of a relatively high velocity.

10. An airflow baffle for controlling airflow through a heating, ventilation, and air conditioning (HVAC) system, the airflow baffle comprising:
    a main body;
    an upstream side of the main body;
    a downstream side of the main body;
    a plurality of holes defined by the main body and extending through the main body between the upstream side and the downstream side; and
    a plurality of guide vanes extending from the main body to divide the plurality of holes into different groups, guide airflow through the plurality of holes, and break down incoming air vortexes;
    wherein the baffle is arranged in the HVAC system downstream of a blower of the HVAC system.

11. The airflow baffle of claim 10, wherein the plurality of guide vanes extend from the upstream side of the main body.

12. The airflow baffle of claim 11, wherein the plurality of guide vanes include vertically extending vanes and horizontally extending vanes.

13. The airflow baffle of claim 10, wherein amongst the different groups the plurality of holes have different diameters to provide uniform airflow through the baffle.

14. The airflow baffle of claim 10, wherein amongst the different groups the plurality of holes are spaced apart differently to provide uniform airflow through the baffle.

15. The airflow baffle of claim 14, wherein within each group the plurality of holes have a common diameter and are evenly spaced apart.

16. A heating, ventilation, and air conditioning (HVAC) system comprising:
    an airflow blower;
    an HVAC case including a heater core; and
    an airflow baffle in an airflow path through the HVAC system, the airflow baffle including:
      a main body;
      an upstream side of the main body;
      a downstream side of the main body; and
      a plurality of holes defined by the main body and extending through the main body between the upstream side and the downstream side; and
      a plurality of guide vanes extending from the upstream side of the main body to divide the plurality of holes into different groups, guide airflow through the plurality of holes, and break down incoming air vortexes;
    wherein:
      amongst the different groups the plurality of holes have different diameters to provide uniform airflow through the baffle;
      amongst the different groups the plurality of holes are spaced apart differently to provide uniform airflow through the baffle; and
      within each group the plurality of holes have a common diameter and are evenly spaced apart.

17. The HVAC system of claim 16, wherein the airflow baffle is along an airflow path between the blower and the HVAC case.

18. The HVAC system of claim 16, wherein the airflow baffle is downstream of the blower.

19. The HVAC system of claim 15, wherein the airflow baffle is at an outlet of the HVAC case.

* * * * *